United States Patent
Shao et al.

(10) Patent No.: US 12,231,539 B2
(45) Date of Patent: Feb. 18, 2025

(54) METHOD AND APPARATUS FOR PROCESSING DATA REQUEST

(71) Applicant: Jingdong Technology Information Technology Co., Ltd., Beijing (CN)

(72) Inventors: Zhuguang Shao, Beijing (CN); Haibo Sun, Beijing (CN); Haiquan Huang, Beijing (CN); Guangwei Zhao, Beijing (CN); Shuang Zhang, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 395 days.

(21) Appl. No.: 17/630,669

(22) PCT Filed: Apr. 1, 2020

(86) PCT No.: PCT/CN2020/082670
§ 371 (c)(1),
(2) Date: Jan. 27, 2022

(87) PCT Pub. No.: WO2021/042713
PCT Pub. Date: Mar. 11, 2021

(65) Prior Publication Data
US 2022/0271924 A1    Aug. 25, 2022

(30) Foreign Application Priority Data
Sep. 3, 2019 (CN) .......................... 201910827775.9

(51) Int. Cl.
*H04L 29/06* (2006.01)
*H04L 9/06* (2006.01)
(Continued)

(52) U.S. Cl.
CPC .......... *H04L 9/0825* (2013.01); *H04L 9/0637* (2013.01); *H04L 9/3247* (2013.01); *H04L 9/3263* (2013.01); *H04L 67/56* (2022.05)

(58) Field of Classification Search
CPC ... H04L 9/0637; H04L 9/0825; H04L 9/3247; H04L 9/3263; H04L 67/56
See application file for complete search history.

(56) References Cited

U.S. PATENT DOCUMENTS

| 10,250,395 B1 | 4/2019 | Borne-Pons et al. |
| 10,581,615 B2 | 3/2020 | Xie et al. |

(Continued)

FOREIGN PATENT DOCUMENTS

| CN | 108418795 A | 8/2018 |
| CN | 109903042 A | 6/2019 |

(Continued)

OTHER PUBLICATIONS

Chinese Office Action for Chinese Application No. 201910827775.9, dated Jun. 2, 2020, 7 pages.

(Continued)

*Primary Examiner* — Jeffrey C Pwu
*Assistant Examiner* — Thong P Truong
(74) *Attorney, Agent, or Firm* — Buchanan Ingersoll & Rooney PC (57) ABSTRACT

A method and an apparatus are provided. The method may include: receiving a query request and signature information of the query request sent from a first node in a blockchain other than a current blockchain, where there is a proxy node of the first node in the current blockchain, and the query request includes a query content and a storage number of a public key of the first node in the current blockchain; acquiring the public key of the first node from the current blockchain based on the storage number of the public key of the first node in the current blockchain; acquiring query data indicated by the query content from the current blockchain, in response to the signature information of the query request passing verification by the public key of the first node; and (Continued)

feeding back a query result to the first node based on the query data.

18 Claims, 5 Drawing Sheets

(51) Int. Cl.
    *H04L 9/08*         (2006.01)
    *H04L 9/32*         (2006.01)
    *H04L 67/56*       (2022.01)

(56) References Cited

U.S. PATENT DOCUMENTS

| | | |
|---|---|---|
| 11,025,417 B2 | 6/2021 | Li et al. |
| 11,093,651 B2 | 8/2021 | Qiu |
| 2019/0238327 A1 | 8/2019 | Li et al. |
| 2019/0251199 A1 | 8/2019 | Klianev |
| 2021/0051023 A1* | 2/2021 | Wei .................. H04L 9/3231 |
| 2021/0258323 A1 | 8/2021 | Qui |
| 2021/0288819 A1 | 9/2021 | Li et al. |

FOREIGN PATENT DOCUMENTS

| | | |
|---|---|---|
| CN | 109948371 A | 6/2019 |
| CN | 110008686 A | 7/2019 |
| CN | 110035045 A | 7/2019 |
| CN | 110535659 A | 12/2019 |
| JP | 2008516030 A | 5/2008 |
| JP | 2019519987 A | 7/2019 |

OTHER PUBLICATIONS

International Search Report and Written Opinion for International Application No. PCT/CN2020/082670, dated Jun. 11, 2020, 6 pages.

* cited by examiner

METHOD AND APPARATUS FOR PROCESSING DATA REQUEST

CROSS-REFERENCE TO RELATED APPLICATIONS

This patent application is a U.S. national stage of International Application No. PCT/CN2020/082670, filed on Apr. 1, 2020, which claims the priority from Chinese Patent Application No. 201910827775.9, filed on Sep. 3, 2019 and titled "Method and Apparatus for Processing Data Request," the contents of each of which are hereby incorporated by reference in their entireties.

TECHNICAL FIELD

Embodiments of the present disclosure relate to the technical field of computers, and specifically relate to a method for processing a data request and an apparatus for processing a data request.

BACKGROUND

A blockchain is a technology of managing data based on a decentralization concept. Because of having a high reliability, the blockchain technology is applied to various data systems.

In many application scenarios, it is necessary to acquire cross-system data to implement a corresponding function. Based on this demand, a cross-chain technology of the blockchain has also developed accordingly. The cross-chain technology of the blockchain is a technology that promotes interaction (e.g., data query and storage) between different blockchains.

SUMMARY OF THE INVENTION

Embodiments of the present disclosure present a method for processing a data request and an apparatus for processing a data request.

In a first aspect, an embodiment of the present disclosure provides a method for processing a data request, including: receiving a query request and signature information of the query request sent from a first node in a blockchain other than a current blockchain, where there is a proxy node of the first node in the current blockchain, and the query request includes a query content and a storage number of a public key of the first node in the current blockchain; acquiring the public key of the first node from the current blockchain based on the storage number of the public key of the first node in the current blockchain; acquiring query data indicated by the query content from the current blockchain, in response to the signature information of the query request passing verification by the public key of the first node; and feeding back a query result to the first node based on the query data.

In a second aspect, an embodiment of the present disclosure provides an apparatus for processing a data request, including: one or more processors; and a storage apparatus storing one or more programs thereon, where the one or more programs, when executed by the one or more processors, cause the one or more processors to implement the method according to any embodiment in the first aspect.

In a third aspect, an embodiment of the present disclosure provides a computer readable medium storing a computer program thereon, where the program, when executed by a processor, implements the method according to any one embodiment in the first aspect.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF THE INVENTION

The present disclosure will be further described in detail below in combination with the accompanying drawings and the embodiments. It should be understood that the specific embodiments described here are merely used for explaining the relevant disclosure, rather than limiting the disclosure. In addition, it should be further noted that, for ease of description, only the portions related to the relevant disclosure are shown in the accompanying drawings.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
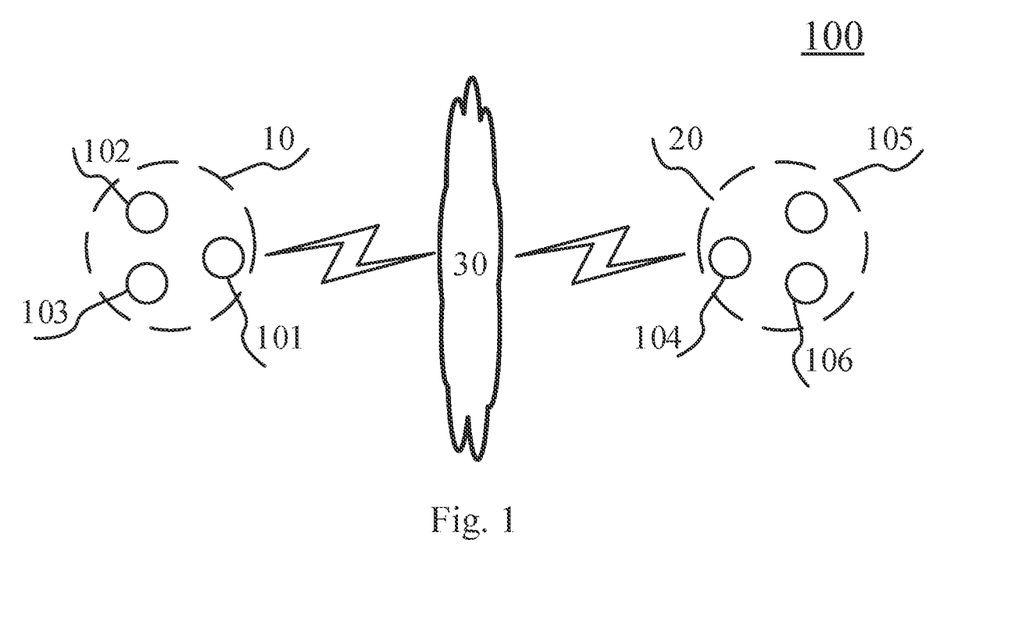
FIG. 1 is a diagram of an example system architecture in which an embodiment of the present disclosure may be implemented.

FIG. 1 shows an example architecture 100 in which a method for processing a data request or an apparatus for processing a data request of the present disclosure may be implemented.

As shown in FIG. 1, the system architecture 100 may include a blockchain 10, a blockchain 20, and a network 30. The blockchain 10 includes nodes 101, 102, and 103, and the blockchain 20 includes nodes 104, 105, and 106. The network 30 serves as a medium providing a communication link between the nodes in the blockchain 10 and the nodes in the blockchain 20. The network 30 may include various types of connections, such as wired or wireless communication links, or optical cables.

When a node in the blockchain 20 has a proxy node in the blockchain 10, the node in the blockchain 20 may acquire to-be-queried data from data stored in the blockchain 10 through the network 30. For example, the node 102 in the blockchain 10 is a proxy node of the node 104 in the blockchain 20, and the node 104 in the blockchain 20 may send a query request and signature information of the query request to the node 101 in the blockchain 10 through the network 30. The node 101 in the blockchain 10 may acquire query data from the blockchain 10 based on the query request and the signature information of the query request, and then feed back the acquired query data to the node 104 in the blockchain 20.

In practice, the nodes 101, 102, 103, 104, 105, and 106 may be terminal devices, or may be servers.

When the nodes 101, 102, 103, 104, 105, and 106 are terminal devices, the nodes may be provided with various communication client applications, such as a blockchain application, a web browser application, a shopping application, and a search application, and may be hardware, or software. When the nodes 101, 102, 103, 104, 105, and 106 are hardware, the nodes may be various electronic devices supporting information sending, including but not limited to a smart phone, a tablet computer, a laptop portable computer, a desktop computer, and the like. When the nodes 101, 102, 103, 104, 105, and 106 are software, the nodes may be installed in the above-listed electronic devices, may be implemented as a plurality of software programs or software modules, or may be implemented as a single software program or software module. This is not specifically limited here.

When the nodes 101, 102, 103, 104, 105, and 106 are servers, the nodes may be hardware, or may be software. When the nodes 101, 102, 103, 104, 105, and 106 are hardware, the nodes may be implemented as a distributed server cluster composed of a plurality of servers, or may be implemented as a single server. When the nodes 101, 102, 103, 104, 105, and 106 are software, the nodes may be implemented as a plurality of software programs or software modules (e.g., a plurality of software programs or software modules for providing distributed services), or may be implemented as a single software program or software module. This is not specifically limited here.

It should be noted that the method for processing a data request provided in an embodiment of the present disclosure is generally executed by a node (e.g., the nodes 101, 102, and 103) in the blockchain 10. Accordingly, the apparatus for processing a data request is generally disposed in the node in the blockchain 10.

It should be understood that the numbers of nodes and networks in FIG. 1 are merely illustrative. Any number of nodes and networks may be provided based on actual requirements.

Figure 2:
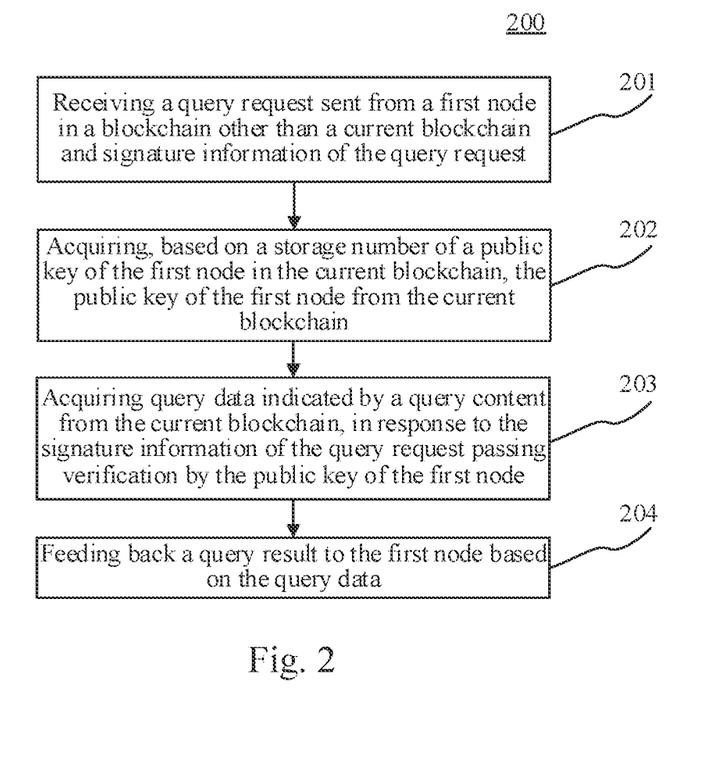
FIG. 2 is a flowchart of a method for processing a data request according to an embodiment of the present disclosure.

Further referring to FIG. 2, a process 200 of a method for processing a data request according to an embodiment of the present disclosure is shown. The method for processing a data request includes the following steps:

Step 201: receiving a query request and signature information of the query request sent from a first node in a blockchain other than a current blockchain.

In the present embodiment, an executing body (e.g., the nodes 101, 102, and 103 as shown in FIG. 1) of the method for processing a data request may receive the query request and signature information of the query request sent from the first node in the blockchain other than the current blockchain In practice, the current blockchain and the other blockchain may be blockchains providing data services for different systems, or may be different blockchains providing different data services for a given system. It may be understood that the executing body and the first node may be two nodes in two different blockchains.

There may be a proxy node of the first node in the current blockchain. That is, the proxy node of the first node may be the executing body, or may be another node in the current blockchain. Here, the proxy node of the first node may be a node that pre-establishes a proxy relationship with the first node. In practice, the first node may send a request for establishing a proxy relationship to a node in the current blockchain, and establish the proxy relationship with the node in the current blockchain on the premise that the node in the current blockchain accepts the request.

The query request may include a query content and a storage number of a public key of the first node in the current blockchain. Here, the query content may be a content to be queried by the first node in the current blockchain. The signature information of the query request may be signature information obtained by the first node through signing for the query request with its private key.

In some alternative implementations of the present embodiment, the proxy node of the first node may establish the proxy relationship with the first node by executing the method shown in step S1 to step S4.

Step S1: sending a received first digital certificate sent from the first node to an authentication platform indicated by the first digital certificate, such that the authentication platform indicated by the first digital certificate authenticates the first digital certificate.

The first digital certificate may include authentication information of the first node, signature information of the authentication information of the first node, and a public key of the authentication platform indicated by the first digital certificate. The authentication information of the first node, e.g., may include the public key of the first node, and e.g., may further include the name, the number, and the like of the first node.

Specifically, the proxy node of the first node may receive the first digital certificate sent from the first node, and send the first digital certificate to the authentication platform indicated by the first digital certificate, for authenticating the first digital certificate. It should be noted that the authentication platform indicated by the first digital certificate may be a third-party platform that authenticates authentication information of a node in a blockchain In practice, the authentication platform indicated by the first digital certificate may sign for the authentication information of the first node with its private key to obtain the signature information of the authentication information of the first node, and process the authentication information of the first node, the signature information of the authentication information of the first node, and its public key to obtain the first digital certificate.

Step S2: signing for the public key of the first node with a private key, in response to an authentication result fed back by the authentication platform indicating that the first digital certificate passes the authentication, to obtain signature information of the public key of the first node.

Specifically, when the authentication result fed back by the authentication platform indicates that the first digital certificate passes the authentication, the proxy node of the first node may sign for the public key of the first node with its private key, to obtain the signature information of the public key of the first node.

It should be noted that in some application scenarios, the authentication result may include information indicating that the first digital certificate passes the authentication, and in some other application scenarios, the authentication result may include the public key of the authentication platform, and signature information of a signature for information indicating that the first digital certificate passes the authentication, the signature being performed by the authentication platform using its private key.

Step S3: submitting the signature information of the public key of the first node and the public key of the first node to the current blockchain as a first piece of submitted data, such that the node in the current blockchain stores the first piece of submitted data in the current blockchain through an employed consensus mechanism.

Specifically, after the proxy node of the first node submits the first piece of submitted data to the current blockchain, nodes in the current blockchain may compete for a right to record the first piece of submitted data based on the consensus mechanism employed by the current blockchain, a node seizing the right to record the first piece of submitted data may record the first piece of submitted data in the current blockchain, and a node failing to seize the right to record the first piece of submitted data may verify the first piece of submitted data recorded by the node seizing the right to record the first piece of submitted data, thereby completing the storage of the first piece of submitted data in the current blockchain after the recorded first piece of submitted data passes the verification.

Step S4: feeding back a proxy result to the first node based on a storage number of the first piece of submitted data in the current blockchain.

Specifically, the proxy node of the first node may feed back the storage number of the first piece of submitted data in the current blockchain to the first node as the proxy result.

In these implementations, the proxy node of the first node establishes the proxy relationship with the first node after the authentication information of the first node passes the authentication by the authentication platform, and may establish the proxy relationship with the first node on the premise of guaranteeing that the first node is safe.

In some alternative implementations of the present embodiment, the proxy node of the first node may execute step S4 by the following approaches.

First, the proxy node of the first node may sign for the storage number of the first piece of submitted data in the current blockchain with its private key to obtain signature information of the storage number of the first piece of submitted data in the current blockchain.

Then, the proxy node of the first node may feed back the signature information of the storage number of the first piece of submitted data in the current blockchain, the storage number of the first piece of submitted data in the current blockchain, and the public key of the proxy node of the first node as the proxy result to the first node.

In these implementations, the signature information of the storage number of the first piece of submitted data in the current blockchain and the public key of the proxy node of the first node are added in the proxy result, thereby preventing the storage number of the first piece of submitted data in the current blockchain from being tampered with during the feedback to the first node.

Step 202: acquiring, based on a storage number of a public key of the first node in the current blockchain, the public key of the first node from the current blockchain.

In the present embodiment, the current blockchain stores public keys of nodes in other blockchains that pre-establishes a proxy relationship with a node in the current blockchain, and the public key of each of the nodes is stored in accordance with a uniquely determined storage number. It may be understood that the public key of the first node is stored in the current blockchain in accordance with a uniquely determined storage number.

In the present embodiment, after receiving the query request, the executing body may acquire the storage number of the public key of the first node included in the query request in the current blockchain, and then acquire a public key indicated by the storage number from the current blockchain, i.e., acquire the public key of the first node.

Step 203: acquiring query data indicated by a query content from the current blockchain, in response to the signature information of the query request passing verification by the public key of the first node.

In the present embodiment, after acquiring the public key of the first node, the executing body may verify the signature information of the query request with the public key of the first node. Specifically, the executing body may decrypt the signature information of the query request with the public key of the first node, may determine that the signature information of the query request passes the verification if the decrypted result is consistent with the query request; and otherwise may determine that the signature information of the query request fails in the verification.

In the present embodiment, the executing body may acquire data indicated by the query content included in the query request, i.e., acquire the query data, from the current blockchain, if the signature information of the query request passes the verification.

In some alternative implementations of the present embodiment, the executing body may execute step 203 by the following approaches.

First, the executing body may determine whether the proxy node of the first node has a query permission of the query content, in response to the signature information of the query request passing the verification by the public key of the first node.

Specifically, the executing body may determine whether the proxy node of the first node has the query permission of the query content included in the query request based on data indicating the query permission of the proxy node of the first node and stored in the current blockchain, if the signature information of the query request passes the verification by the public key of the first node.

Then, the executing body may acquire the query data indicated by the query content from the current blockchain, in response to the proxy node of the first node having the query permission of the query content.

Specifically, the executing body may acquire the query data indicated by the query content from the current blockchain, if the proxy node of the first node has the query permission of the query content included in the query request.

In these implementations, on the premise that the proxy node of the first node has the query permission of the query content included in the query request, the query data indicated by the query content is acquired from the current blockchain, thereby guaranteeing that the first node queries data within a range of the query permission of its proxy node from the current blockchain.

Step 204: feeding back a query result to the first node based on the query data.

In the present embodiment, after acquiring the query data, the executing body may feed back the query data as the query result to the first node.

In some alternative implementations of the present embodiment, after acquiring the query data, the executing body may execute step 204 by the following approaches.

First, the executing body may sign for the query data with its private key to obtain signature information of the query data.

Then, the executing body may feed back the signature information of the query data, the query data, and its public key as the query result to the first node.

In these implementations, the signature information of the query data and the public key of the executing body are added in the query result, thereby preventing the query data from being tampered with during the feedback to the first node.

Figure 3:
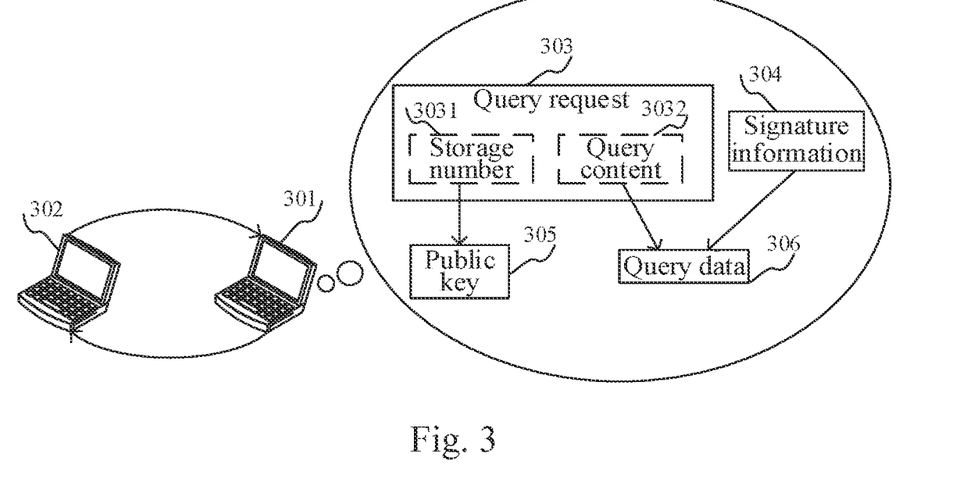
FIG. 3 is a schematic diagram of an application scenario of the method for processing a data request according to an embodiment of the present disclosure.

Further referring to FIG. 3, FIG. 3 is a schematic diagram of an application scenario of the method for processing a data request according to the present embodiment. In the application scenario of FIG. 3, a terminal device 301 is a node in a current blockchain, a terminal device 302 is a node in other blockchains, and there is a proxy node of the terminal device 302 in the current blockchain.

First, the terminal device 301 may receive a query request 303 and signature information 304 of the query request 303 sent from the terminal device 302. The query request 303 may include a query content 3032 and a storage number 3031 of a public key of the terminal device 302 in the current blockchain. Then, the terminal device 301 may acquire a public key 305 of the terminal device 302 from the current blockchain based on the storage number 3031. Then, the terminal device 301 may verify the signature information 304 with the acquired public key 305. If the signature information passes the verification, the terminal device 301 may acquire query data 306 indicated by the query content 3032 from the current blockchain. Finally, the terminal device 301 may feed back the query data 306 as a query result to the terminal device 302.

At present, in terms of cross-blockchain, an existing technology realizes interaction between different blockchains by introducing a third-party notary using a notary mechanism, which may increase the risks of revealing data stored in a blockchain during a cross-chain process. Alternatively, an existing technology realizes interaction between different blockchains by introducing a side chain (or a relay chain) using a side chain (or a relay chain) mode, which may increase a fault point in a cross-chain process, i.e., side chain (or relay chain) failure will cause failure to complete the cross-chain process. In the method provided in the above embodiments of the present disclosure, there is a proxy node of a first node of other blockchains in the current blockchain, and after signature information of a query request sent from the first node passes verification, the executing body may acquire the query data indicated by the query content included in the query request sent from the first node from the current blockchain, and feed back the query result to the first node, thereby querying data in the current blockchain by the first node in other blockchains without introducing a third-party notary and a side chain (or a relay chain), i.e., realizing cross-chain query of data on the basis of low risks of revealing data stored in a blockchain without increasing a fault point.

Figure 4:
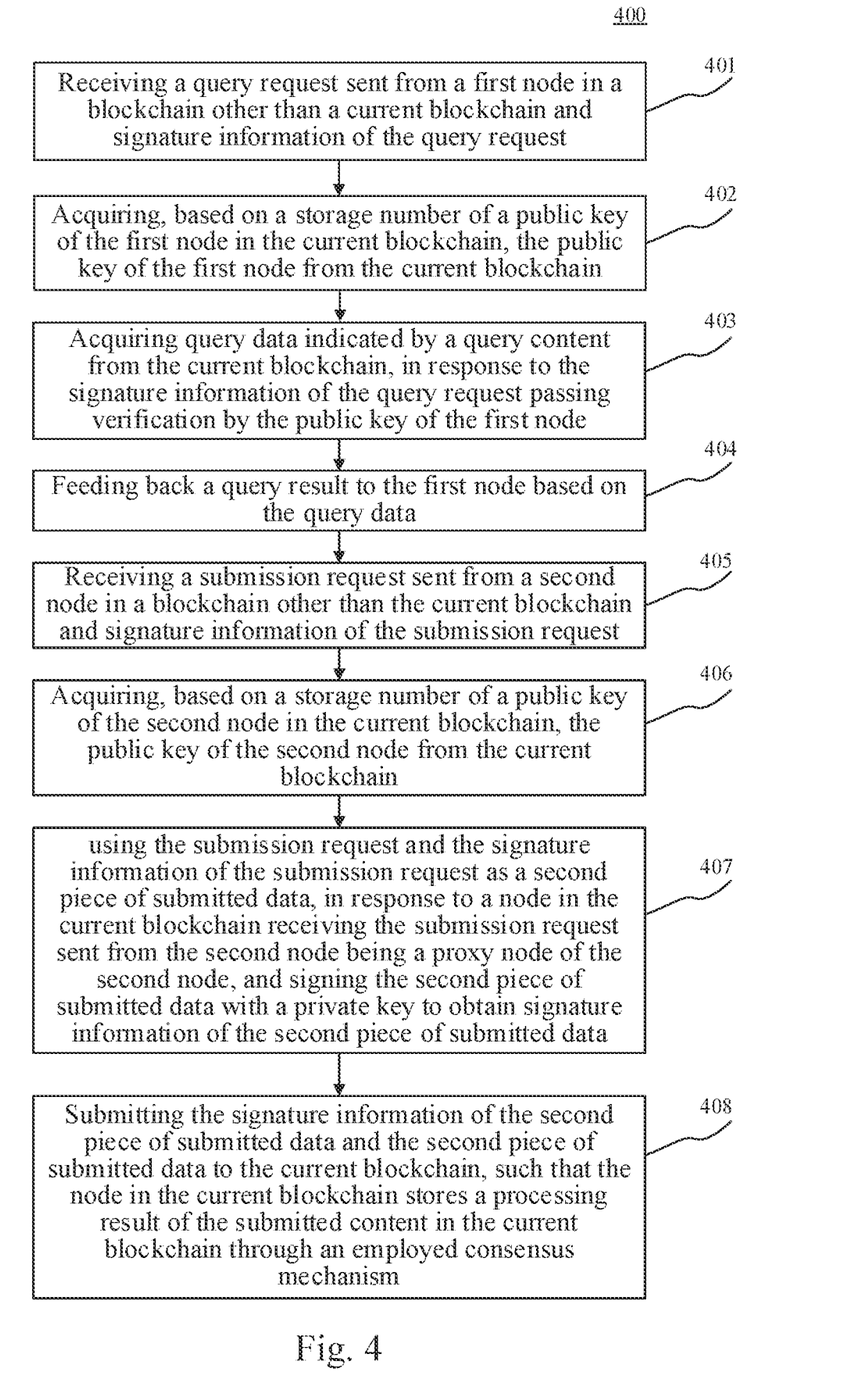
FIG. 4 is a flowchart of the method for processing a data request according to another embodiment of the present disclosure.

Further referring to FIG. 4, a process 400 of the method for processing a data request according to another embodiment is shown. The process 400 of the method for processing a data request includes the following steps:

Step 401: receiving a query request and signature information of the query request sent from a first node in a blockchain other than a current blockchain.

Step 402: acquiring, based on a storage number of a public key of the first node in the current blockchain, the public key of the first node from the current blockchain.

Step 403: acquiring query data indicated by a query content from the current blockchain, in response to the signature information of the query request passing verification by the public key of the first node.

Step 404: feeding back a query result to the first node based on the query data.

The above step 401, step 402, step 403, and step 404 may be executed by approaches similar to the approaches of executing step 201, step 202, step 203, and step 204 in some embodiment as shown in FIG. 2, respectively. The above description on step 201, step 202, step 203, and step 204 also apply to step 401, step 402, step 403, and step 404. The description will not be repeated here.

Step 405: receiving a submission request and signature information of the submission request sent from a second node in a blockchain other than the current blockchain.

In the present embodiment, an executing body (e.g., the nodes 101, 102, and 103 as shown in FIG. 1) of the method for processing a data request may receive the submission request and the signature information of the submission request sent from the second node in the blockchain other than the current blockchain.

There is a proxy node of the second node in the current blockchain. Similar to the content described in step 201, the proxy node of the second node may be the executing body, or may be other node in the current blockchain. The proxy node of the second node may be a node that pre-establishes a proxy relationship with the second node. In practice, the second node may send a request for establishing a proxy relationship to a node in the current blockchain, and establish the proxy relationship with the node in the current blockchain on the premise that the node in the current blockchain accepts the request.

The submission request may include a submitted content and a storage number of a public key of the second node in the current blockchain. Here, the submitted content may be a content to be stored by the second node in the current blockchain. The signature information of the submission request may be signature information obtained by the second node through signing for the submission request with its private key.

It should be noted that, the other blockchain here and the other blockchain described in step 201 may be a given blockchain, or may be different blockchains. The second node and the first node may be the given node, or may be different nodes. In addition, the executing body may execute step 401 and step 405 in sequence, or may execute step 401 and step 405 concurrently.

In some alternative implementations of the present embodiment, the proxy node of the second node may establish the proxy relationship with the second node by executing the method shown in step T1 to step T4.

Step T1: sending a received second digital certificate sent from the second node to an authentication platform indicated by the second digital certificate, such that the authentication platform indicated by the second digital certificate authenticates the second digital certificate.

The second digital certificate may include authentication information of the second node, signature information of the authentication information of the second node, and a public key of the authentication platform. The authentication information of the second node, e.g., may include the public key of the second node, and e.g., may further include the name, the number, and the like of the second node.

Step T2: signing for the public key of the second node with a private key, in response to an authentication result fed back by the authentication platform indicating that the second digital certificate passes the authentication, to obtain signature information of the public key of the second node.

Step T3: submitting the signature information of the public key of the second node and the public key of the second node as a third piece of submitted data to the current blockchain, such that the node in the current blockchain stores the third piece of submitted data in the current blockchain through an employed consensus mechanism.

Step T4: feeding back a proxy result to the second node based on a storage number of the third piece of submitted data in the current blockchain.

It should be noted that the approaches by which the proxy node of the second node executes step T1 to step T4 are similar to the approaches by which the proxy node of the first node executes step S1 to step S4. The description will not be repeated here.

In these implementations, the proxy node of the second node establishes the proxy relationship with the second node after the authentication information of the second node passes the authentication by the authentication platform indicated by the second digital certificate, and may establish the proxy relationship with the second node on the premise of guaranteeing that the second node is safe.

In some alternative implementations of the present embodiment, the proxy node of the second node may execute step T4 by the following approaches.

First, the proxy node of the second node may sign for the storage number of the third piece of submitted data in the current blockchain with its private key to obtain signature information of the storage number of the third piece of submitted data in the current blockchain.

Then, the proxy node of the second node may feed back the signature information of the storage number of the third piece of submitted data in the current blockchain, the storage number of the third piece of submitted data in the current blockchain, and the public key of the proxy node of the second node to the second node as the proxy result.

In these implementations, the signature information of the storage number of the third piece of submitted data in the current blockchain and the public key of the proxy node of the second node are added in the proxy result, thereby preventing the storage number of the third piece of submitted data in the current blockchain from being tampered with during the feedback to the second node.

Step 406: acquiring, based on a storage number of a public key of the second node in the current blockchain, the public key of the second node from the current blockchain.

In the present embodiment, after receiving the submission request and the signature information of the submission request sent from the second node, the executing body may acquire the public key of the second node from the current blockchain based on the storage number of the public key of the second node included in the submission request in the current blockchain.

Step 407: using the submission request and the signature information of the submission request as a second piece of submitted data, in response to a node in the current blockchain receiving the submission request sent from the second node being a proxy node of the second node, and signing for the second piece of submitted data with a private key to obtain signature information of the second piece of submitted data.

In the present embodiment, after acquiring the public key of the second node, the executing body may further determine whether the node in the current blockchain receiving the submission request sent from the second node is the proxy node of the second node, i.e., determine whether the executing body itself is the proxy node of the second node. In practice, the executing body may determine whether itself is the proxy node of the second node based on information of the proxy node of the second node stored in the current blockchain.

In the present embodiment, after determining that itself is the proxy node of the second node, the executing body may use the submission request and the signature information of the submission request as the second piece of submitted data. Then, the executing body may sign for the obtained second piece of submitted data with its private key to obtain the signature information of the second piece of submitted data.

In some alternative implementations of the present embodiment, the executing body may execute step 407 by the following approaches.

First, the executing body may determine whether there is an abnormality in the submitted content, in response to the node in the current blockchain receiving the submission request sent from the second node being the proxy node of the second node and the signature information of the submission request passing the verification by the public key of the second node.

Specifically, after acquiring the public key of the second node, the executing body not only may determine whether itself is the proxy node of the second node, but also may verify the signature information of the submission request with the public key of the second node. After determining that the executing body is the proxy node of the second node and the signature information of the submission request passes the verification, the executing body may further determine whether there is an abnormality in the submitted content included in the submission request. Here, the abnormality of the submitted content may mean that the submitted content has an adverse effect (for example, an infinite loop) on the current blockchain.

Then, the executing body may use the submission request and the signature information of the submission request as the second piece of submitted data, in response to there not being an abnormality in the submitted content, and sign for the second piece of submitted data with the private key to obtain the signature information of the second piece of submitted data.

Specifically, when determining that there is no abnormality in the submitted content, the executing body may use the submission request and the signature information of the submission request as the second piece of submitted data, and sign for the second piece of submitted data with its private key to obtain the signature information of the second piece of submitted data.

In these implementations, after determining that there is no abnormality in the submitted content, signing is performed for the second piece of submitted data, thereby guaranteeing that data submitted by the second node to the current blockchain does not affect the running of the current blockchain.

Step 408: submitting the signature information of the second piece of submitted data and the second piece of submitted data to the current blockchain, such that the node in the current blockchain stores a processing result of the submitted content in the current blockchain through an employed consensus mechanism.

In the present embodiment, the executing body may submit the signature information of the second piece of submitted data and the second piece of submitted data to the current blockchain, and then the node in the current blockchain may process the submitted content in the submission request by the following approaches to obtain the processing result.

First, the node in the current blockchain may acquire the public key of the proxy node of the second node and the public key of the second node from the current blockchain based on the storage number of the public key of the second node in the current blockchain.

Then, the node in the current blockchain may process the submitted content to obtain the processing result, in response to the signature information of the second piece of submitted data passing verification by the public key of the proxy node of the second node and the signature information of the submission request passing the verification by the public key of the second node.

As an example, the submitted content may be "An account balance of A is 1000, an account balance of B is 500, and A transfers 300 to B." The node in the current blockchain may process the submitted content by determining account balances of A and B after the account transfer, and then the obtained processing result may be "an account balance of A is 700, and an account balance of B is 800."

In the present embodiment, the node in the current blockchain may also store the obtained processing result in the current blockchain through the consensus mechanism employed in the current blockchain.

In some alternative implementations of the present embodiment, after step 408, the executing body may feed back a submission result to the second node based on a storage number of the processing result in the current blockchain.

Specifically, the executing body may feed back the storage number of the processing result in the current blockchain as the submission result to the second node. It may be understood that the storage number of the processing result in the current blockchain is fed back to the second node as the submission result, such that, on the one hand, the second node may be informed of having completed the process of submitting data in the current blockchain, and on the other hand, the second node may query the submitted data in the current blockchain based on the received storage number.

In some alternative implementations of the present embodiment, the executing body may feed back the submission result to the second node by the following approaches.

First, the executing body may sign for the storage number of the processing result in the current blockchain with its private key to obtain signature information of the storage number of the processing result in the current blockchain.

Second, the executing body may feed back the signature information of the storage number of the processing result in the current blockchain, the storage number of the processing result in the current blockchain, and its public key, as the submission result, to the second node.

In these implementations, the signature information of the storage number of the processing result in the current blockchain and the public key of the executing body are added in the submission result, thereby preventing the storage number of the processing result in the current blockchain from being tampered with during the feedback to the second node.

As can be seen from FIG. 4, in the process 400 of the method for processing a data request in the present embodiment, there is a proxy node of a second node of other blockchains in a current blockchain; and the executing body, after determining that itself is the proxy node of the second node, uses a submission request and signature information of the submission request sent from the second node as a second piece of submitted data and signs for the second piece of submitted data with its private key, to obtain signature information of the second piece of submitted data, and submits the second piece of submitted data and the signature information of the second piece of submitted data to the current blockchain, such that a node in the current blockchain stores a processing result of a submitted content included in the submission request in the current blockchain through an employed consensus mechanism, thereby storing data in the current blockchain by the second node in other blockchains without introducing a third-party notary and a side chain (or a relay chain), i.e., realizing cross-chain storage of data without increasing the risks of revealing data stored in a blockchain and without increasing a fault point.

Figure 5:
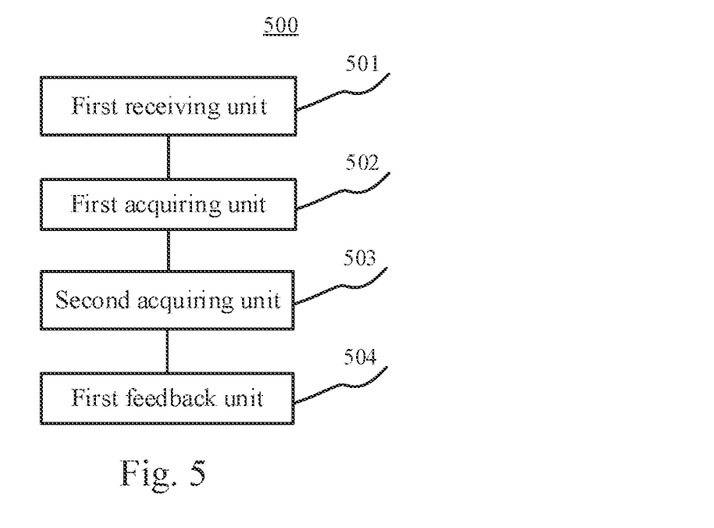
FIG. 5 is a schematic structural diagram of an apparatus for processing a data request according to an embodiment of the present disclosure.

Further referring to FIG. 5, as an implementation of the method shown in the above figures, an embodiment of the present disclosure provides an apparatus for processing a data request. The embodiment of the apparatus corresponds to the embodiment of the method shown in FIG. 2. The apparatus may be specifically applied to various electronic devices.

As shown in FIG. 5, the apparatus 500 for processing a data request in the present embodiment includes: a first receiving unit 501, a first acquiring unit 502, a second acquiring unit 503, and a first feedback unit 504. The first receiving unit 501 may be configured to: receive a query request and signature information of the query request sent from a first node in a blockchain other than a current blockchain, where there is a proxy node of the first node in the current blockchain, and the query request includes a query content and a storage number of a public key of the first node in the current blockchain. The first acquiring unit 502 may be configured to: acquire the public key of the first node from the current blockchain based on the storage number of the public key of the first node in the current blockchain. The second acquiring unit 503 may be configured to: acquire query data indicated by the query content from the current blockchain, in response to the signature information of the query request passing verification by the public key of the first node. The first feedback unit 504 may be configured to: feed back a query result to the first node based on the query data.

The related description of step 201, step 202, step 203, and step 204 in the corresponding embodiment of FIG. 2 may be referred to for specific processing of the first receiving unit 501, the first acquiring unit 502, the second acquiring unit 503, and the first feedback unit 504 of the apparatus 500 for processing a data request in the present embodiment and the technical effects thereof, respectively. The description will not be repeated here.

In some alternative implementations of the present embodiment, the second acquiring unit 503 may be further configured to: determine whether the proxy node of the first node has a query permission of the query content, in response to the signature information of the query request passing the verification by the public key of the first node; and acquire the query data indicated by the query content from the current blockchain, in response to the proxy node of the first node having the query permission of the query content.

In some alternative implementations of the present embodiment, the first feedback unit 504 may be further configured to: sign for the query data with a private key to obtain signature information of the query data; and feed back the signature information of the query data, the query data, and the public key as the query result to the first node.

In some alternative implementations of the present embodiment, the proxy relationship between the proxy node of the first node and the first node is established by executing: sending a received first digital certificate sent from the first node to an authentication platform indicated by the first digital certificate, such that the authentication platform indicated by the first digital certificate authenticates the first digital certificate, where the first digital certificate includes authentication information of the first node, signature information of the authentication information of the first node, and a public key of the authentication platform indicated by the first digital certificate, and the authentication information of the first node includes the public key of the first node; signing for the public key of the first node with a private key, in response to an authentication result fed back by the authentication platform indicating that the first digital certificate passes the authentication, to obtain signature information of the public key of the first node; submitting the signature information of the public key of the first node and the public key of the first node as a first piece of submitted data to the current blockchain, such that a node in the current blockchain stores the first piece of submitted data in the current blockchain through an employed consensus mechanism; and feeding back a proxy result to the first node based on a storage number of the first piece of submitted data in the current blockchain.

In some alternative implementations of the present embodiment, the proxy result fed back to the first node is fed back to the first node by: signing for the storage number of the first piece of submitted data in the current blockchain with the private key to obtain signature information of the storage number of the first piece of submitted data in the current blockchain; and feeding back the signature information of the storage number of the first piece of submitted data in the current blockchain, the storage number of the first piece of submitted data in the current blockchain, and the public key as the proxy result to the first node.

In some alternative implementations of the present embodiment, the apparatus 500 may further include: a second acquiring unit (not shown in the figure), a third acquiring unit (not shown in the figure), a signing unit (not shown in the figure), and a submitting unit (not shown in the figure). The second receiving unit may be configured to: receive a submission request and signature information of the submission request sent from a second node in a blockchain other than the current blockchain, where there is a proxy node of the second node in the current blockchain, and the submission request includes a submitted content and a storage number of a public key of the second node in the current blockchain. The third acquiring unit may be configured to: acquire the public key of the second node from the current blockchain based on the storage number of the public key of the second node in the current blockchain. The signing unit may be configured to: use the submission request and the signature information of the submission request as a second piece of submitted data, in response to a node in the current blockchain receiving the submission request sent from the second node being the proxy node of the second node, and sign for the second piece of submitted data with the private key to obtain signature information of the second piece of submitted data. The submitting unit may be configured to: submit the signature information of the second piece of submitted data and the second piece of submitted data to the current blockchain, such that the node in the current blockchain stores a processing result of the submitted content in the current blockchain through the employed consensus mechanism, where the node in the current blockchain processes the submitted content by: acquiring a public key of the proxy node of the second node and the public key of the second node from the current blockchain based on the storage number of public key of the second node in the current blockchain; and processing the submitted content to obtain the processing result, in response to the signature information of the second piece of submitted data passing verification by the public key of the proxy node of the second node and the signature information of the submission request passing verification by the public key of the second node.

In some alternative implementations of the present embodiment, the apparatus 500 may further include a second feedback unit (not shown in the figure). The second feedback unit may be further configured to: feed back a submission result to the second node based on a storage number of the processing result in the current blockchain.

In some alternative implementations of the present embodiment, the signing unit may be further configured to: determine whether there is an abnormality in the submitted content, in response to the node in the current blockchain receiving the submission request sent from the second node being the proxy node of the second node and the signature information of the submission request passing the verification by the public key of the second node; and use the submission request and the signature information of the submission request as the second piece of submitted data, in response to there not being an abnormality in the submitted content, and sign for the second piece of submitted data with the private key to obtain the signature information of the second piece of submitted data.

In some alternative implementations of the present embodiment, the second feedback unit may be further configured to: sign for the storage number of the processing result in the current blockchain with the private key to obtain signature information of the storage number of the processing result in the current blockchain; and feed back the signature information of the storage number of the processing result in the current blockchain, the storage number of the processing result in the current blockchain, and the public key to the second node as the submission result.

In some alternative implementations of the present embodiment, the proxy relationship between the proxy node of the second node and the second node is established by executing: sending a received second digital certificate sent from the second node to an authentication platform indicated by the second digital certificate, such that the authentication platform indicated by the second digital certificate authenticates the second digital certificate, where the second digital certificate includes authentication information of the second node, signature information of the authentication information of the second node, and a public key of the authentication platform indicated by the second digital certificate, and the authentication information of the second node includes the public key of the second node; signing for the public key of the second node with the private key, in response to an authentication result fed back by the authentication platform indicated by the second digital certificate indicating that the second digital certificate passes the authentication, to obtain signature information of the public key of the second node; submitting the signature information of the public key of the second node and the public key of the second node as a third piece of submitted data to the current blockchain, such that the node in the current blockchain stores the third piece of submitted data in the current blockchain through the employed consensus mechanism; and feeding back the proxy result to the second node based on a storage number of the third piece of submitted data in the current blockchain.

In some alternative implementations of the present embodiment, the proxy result fed back to the second node is fed back to the second node by: signing for the storage number of the third piece of submitted data in the current blockchain with the private key to obtain signature information of the storage number of the third piece of submitted data in the current blockchain; and feeding back the signature information of the storage number of the third piece of submitted data in the current blockchain, the storage number of the third piece of submitted data in the current blockchain, and the public key as the proxy result to the second node.

The apparatus provided in the above embodiments of the present disclosure first receives, by a first receiving unit 501, a query request and signature information of the query request sent from a first node in a blockchain other than a current blockchain, then acquires, by a first acquiring unit 502, a public key of the first node from the current blockchain based on a storage number of the public key of the first node in the current blockchain, then acquires, by a second acquiring unit 503, query data indicated by a query content from the current blockchain after the signature information of the query request passes verification by the public key of the first node, and finally feeds back, by a first feedback unit 504, a query result to the first node based on the query data, thereby querying data in the current blockchain by the first node in other blockchains without introducing a third-party notary and a side chain (or a relay chain), i.e., realizing cross-chain query of data on the basis of low risks of revealing data stored in a blockchain without increasing a fault point.

Figure 6:
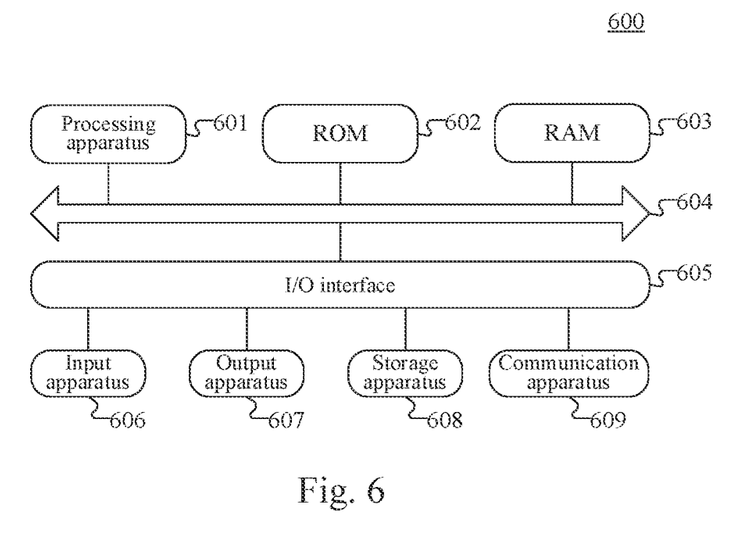
FIG. 6 is a schematic structural diagram adapted to implementing an electronic device of embodiments of the present disclosure.

Referring to FIG. 6 below, a schematic structural diagram adapted to implementing an electronic device 600 (e.g., the nodes 101, 102, and 103 in FIG. 1) of embodiments of the present disclosure is shown. The electronic device shown in FIG. 6 is merely an example, and should not limit the functions and scope of use of the embodiments of the present disclosure.

As shown in FIG. 6, the electronic device 600 may include a processing apparatus 601 (e.g., a central processing unit or a graphics processing unit), which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to some embodiments of the present disclosure, the process described above with reference to the flow chart may be implemented as a computer software program. For example, some embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functions as defined by the method of some embodiments of the present disclosure. It should be noted that the computer readable medium of some embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus or element. In some embodiments of the present disclosure, the computer readable signal medium may include a data signal in the base band or propagating as a part of a carrier wave, in which a computer readable program code is carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program code contained on the computer readable medium may be transmitted with any suitable medium, including but not limited to: wire, an optical cable, a RF (radio frequency) medium etc., or any suitable combination of the above.

The computer readable medium may be included in the above electronic device; or may be a stand-alone computer readable medium without being assembled into the electronic device. The computer readable medium carries one or more programs, where the one or more programs, when executed by the electronic device, cause the electronic device to: receive a query request and signature information of the query request sent from a first node in a blockchain other than a current blockchain, where there is a proxy node of the first node in the current blockchain, and the query request includes a query content and a storage number of a public key of the first node in the current blockchain; acquire the public key of the first node from the current blockchain based on the storage number of the public key of the first node in the current blockchain; acquire query data indicated by the query content from the current blockchain, in response to the signature information of the query request passing verification by the public key of the first node; and feed back a query result to the first node based on the query data.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software, or may be implemented by hardware. The described units may also be provided in a processor, for example, described as: a processor including a first receiving unit, a first acquiring unit, a second acquiring unit, and a first feedback unit. The names of the units do not constitute a limitation to such units themselves in some cases. For example, the first feedback unit may be further described as "a unit configured to feed back a query result to a first node based on query data."

The above description only provides explanation of the preferred embodiments and the employed technical principles of the present disclosure. It should be appreciated by those skilled in the art that the inventive scope of the present disclosure is not limited to the technical solutions formed by particular combinations of the above-described technical features, and should also cover other technical solutions formed by any combinations of the above-described technical features or equivalent features thereof without departing from the above inventive concepts, for example, technical solutions formed by interchanging the above-described features with, but not limited to, technical features with similar functions disclosed in the present disclosure.

What is claimed is:

1. A method for processing a data request, comprising:
  receiving a query request and signature information of the query request sent from a first node in a blockchain other than a current blockchain, wherein there is a proxy node of the first node in the current blockchain, and the query request comprises a query content and a storage number of a public key of the first node in the current blockchain;
  acquiring the public key of the first node from the current blockchain based on the storage number of the public key of the first node in the current blockchain;
  acquiring query data indicated by the query content from the current blockchain, in response to the signature information of the query request passing verification by the public key of the first node;
  feeding back a query result to the first node based on the query data;
  receiving a submission request and signature information of the submission request sent from a second node in a blockchain other than the current blockchain, wherein there is a proxy node of the second node in the current blockchain, and the submission request comprises a submitted content and a storage number of a public key of the second node in the current blockchain;
  acquiring the public key of the second node from the current blockchain based on the storage number of the public key of the second node in the current blockchain;
  using the submission request and the signature information of the submission request as a second piece of submitted data, in response to a node in the current blockchain receiving the submission request sent from the second node being the proxy node of the second node, and signing for the second piece of submitted data with the private key to obtain signature information of the second piece of submitted data; and
  submitting the signature information of the second piece of submitted data and the second piece of submitted data to the current blockchain, such that the node in the current blockchain stores a processing result of the submitted content in the current blockchain through the employed consensus mechanism, wherein the node in the current blockchain processes the submitted content by: acquiring a public key of the proxy node of the second node and the public key of the second node from the current blockchain based on the storage number of public key of the second node in the current blockchain; and processing the submitted content to obtain the processing result, in response to the signature information of the second piece of submitted data passing verification by the public key of the proxy node of the second node and the signature information of the submission request passing verification by the public key of the second node.

2. The method according to claim 1, wherein the acquiring the query data indicated by the query content from the current blockchain, in response to the signature information of the query request passing the verification by the public key of the first node comprises:
  determining whether the proxy node of the first node has a query permission of the query content, in response to the signature information of the query request passing the verification by the public key of the first node; and
  acquiring the query data indicated by the query content from the current blockchain, in response to the proxy node of the first node having the query permission of the query content.

3. The method according to claim 1, wherein the feeding back the query result to the first node based on the query data comprises:
- signing for the query data with a private key to obtain signature information of the query data; and
- feeding back the signature information of the query data, the query data, and a public key of the proxy node of the first node as the query result to the first node.

4. The method according to claim 1, wherein the proxy node of the first node establishes a proxy relationship with the first node by executing:
- sending a received first digital certificate sent from the first node to an authentication platform indicated by the first digital certificate, such that the authentication platform indicated by the first digital certificate authenticates the first digital certificate, wherein the first digital certificate comprises authentication information of the first node, signature information of the authentication information of the first node, and a public key of the authentication platform indicated by the first digital certificate, and the authentication information of the first node comprises the public key of the first node;
- signing for the public key of the first node with a private key, in response to an authentication result fed back by the authentication platform indicated by the first digital certificate indicating that the first digital certificate passes the authentication, to obtain signature information of the public key of the first node;
- submitting the signature information of the public key of the first node and the public key of the first node to the current blockchain as a first piece of submitted data, such that a node in the current blockchain stores the first piece of submitted data in the current blockchain through an employed consensus mechanism; and
- feeding back a proxy result to the first node based on a storage number of the first piece of submitted data in the current blockchain.

5. The method according to claim 4, wherein the feeding back the proxy result to the first node based on the storage number of the first piece of submitted data in the current blockchain comprises:
- signing for the storage number of the first piece of submitted data in the current blockchain with the private key to obtain signature information of the storage number of the first piece of submitted data in the current blockchain; and
- feeding back the signature information of the storage number of the first piece of submitted data in the current blockchain, the storage number of the first piece of submitted data in the current blockchain, and a public key of the proxy node of the first node as the proxy result to the first node.

6. The method according to claim 1, wherein the method further comprises:
- feeding back a submission result to the second node based on a storage number of the processing result in the current blockchain.

7. The method according to claim 6, wherein the feeding back the submission result to the second node based on the storage number of the processing result in the current blockchain comprises:
- signing for the storage number of the processing result in the current blockchain with the private key to obtain signature information of the storage number of the processing result in the current blockchain; and
- feeding back the signature information of the storage number of the processing result in the current blockchain, the storage number of the processing result in the current blockchain, and a public key of the proxy node of the first node as the submission result to the second node.

8. The method according to claim 1, wherein the using the submission request and the signature information of the submission request as the second piece of submitted data, in response to the node in the current blockchain receiving the submission request sent from the second node being the proxy node of the second node, and signing for the second piece of submitted data with the private key to obtain the signature information of the second piece of submitted data comprises:
- determining whether there is an abnormality in the submitted content, in response to the node in the current blockchain receiving the submission request sent from the second node being the proxy node of the second node and the signature information of the submission request passing the verification by the public key of the second node; and
- using the submission request and the signature information of the submission request as the second piece of submitted data, in response to there not being an abnormality in the submitted content, and signing for the second piece of submitted data with the private key to obtain the signature information of the second piece of submitted data.

9. The method according to claim 1, wherein the proxy node of the second node establishes a proxy relationship with the second node by executing:
- sending a received second digital certificate sent from the second node to an authentication platform indicated by the second digital certificate, such that the authentication platform indicated by the second digital certificate authenticates the second digital certificate, wherein the second digital certificate comprises authentication information of the second node, signature information of the authentication information of the second node, and a public key of the authentication platform indicated by the second digital certificate, and the authentication information of the second node comprises the public key of the second node;
- signing for the public key of the second node with the private key to obtain signature information of the public key of the second node, in response to an authentication result fed back by the authentication platform indicated by the second digital certificate indicating that the second digital certificate passes the authentication;
- submitting the signature information of the public key of the second node and the public key of the second node to the current blockchain as a third piece of submitted data, such that the node in the current blockchain stores the third piece of submitted data in the current blockchain through the employed consensus mechanism; and
- feeding back the proxy result to the second node based on a storage number of the third piece of submitted data in the current blockchain.

10. The method according to claim 9, wherein the feeding back the proxy result to the second node based on the storage number of the third piece of submitted data in the current blockchain comprises:
- signing for the storage number of the third piece of submitted data in the current blockchain with the private key to obtain signature information of the storage number of the third piece of submitted data in the current blockchain; and feeding back the signature information of the storage number of the third piece of submitted data in the current blockchain, the storage number of the third piece of submitted data in the current blockchain, and a public key of the proxy node of the first node as the proxy result to the second node.

11. An apparatus for processing a data request, comprising:
at least one processor; and
a memory storing instructions, wherein the instructions when executed by the at least one processor, cause the at least one processor to perform operations, the operations comprising:
receiving a query request sent from a first node in a blockchain other than a current blockchain and signature information of the query request, wherein there is a proxy node of the first node in the current blockchain, and the query request comprises a query content and a storage number of a public key of the first node in the current blockchain;
acquiring the public key of the first node from the current blockchain based on the storage number of the public key of the first node in the current blockchain;
acquiring query data indicated by the query content from the current blockchain, in response to the signature information of the query request passing verification by the public key of the first node;
feeding back a query result to the first node based on the query data;
receiving a submission request and signature information of the submission request sent from a second node in a blockchain other than the current blockchain, wherein there is a proxy node of the second node in the current blockchain, and the submission request comprises a submitted content and a storage number of a public key of the second node in the current blockchain;
acquiring the public key of the second node from the current blockchain based on the storage number of the public key of the second node in the current blockchain;
using the submission request and the signature information of the submission request as a second piece of submitted data, in response to a node in the current blockchain receiving the submission request sent from the second node being the proxy node of the second node, and signing for the second piece of submitted data with the private key to obtain signature information of the second piece of submitted data; and
submitting the signature information of the second piece of submitted data and the second piece of submitted data to the current blockchain, such that the node in the current blockchain stores a processing result of the submitted content in the current blockchain through the employed consensus mechanism, wherein the node in the current blockchain processes the submitted content by: acquiring a public key of the proxy node of the second node and the public key of the second node from the current blockchain based on the storage number of public key of the second node in the current blockchain; and processing the submitted content to obtain the processing result, in response to the signature information of the second piece of submitted data passing verification by the public key of the proxy node of the second node and the signature information of the submission request passing verification by the public key of the second node.

12. The apparatus according to claim 11, wherein the acquiring the query data indicated by the query content from the current blockchain, in response to the signature information of the query request passing the verification by the public key of the first node comprises:
determining whether the proxy node of the first node has a query permission of the query content, in response to the signature information of the query request passing the verification by the public key of the first node; and
acquiring the query data indicated by the query content from the current blockchain, in response to the proxy node of the first node having the query permission of the query content.

13. The apparatus according to claim 11, wherein the feeding back the query result to the first node based on the query data comprises:
signing for the query data with a private key to obtain signature information of the query data; and
feeding back the signature information of the query data, the query data, and a public key of the proxy node of the first node as the query result to the first node.

14. The apparatus according to claim 11, wherein the proxy node of the first node establishes a proxy relationship with the first node by executing:
sending a received first digital certificate sent from the first node to an authentication platform indicated by the first digital certificate, such that the authentication platform indicated by the first digital certificate authenticates the first digital certificate, wherein the first digital certificate comprises authentication information of the first node, signature information of the authentication information of the first node, and a public key of the authentication platform indicated by the first digital certificate, and the authentication information of the first node comprises the public key of the first node;
signing for the public key of the first node with a private key, in response to an authentication result fed back by the authentication platform indicated by the first digital certificate indicating that the first digital certificate passes the authentication, to obtain signature information of the public key of the first node;
submitting the signature information of the public key of the first node and the public key of the first node to the current blockchain as a first piece of submitted data, such that a node in the current blockchain stores the first piece of submitted data in the current blockchain through an employed consensus mechanism; and
feeding back a proxy result to the first node based on a storage number of the first piece of submitted data in the current blockchain.

15. The apparatus according to claim 14, wherein the feeding back the proxy result to the first node based on the storage number of the first piece of submitted data in the current blockchain comprises:
signing for the storage number of the first piece of submitted data in the current blockchain with the private key to obtain signature information of the storage number of the first piece of submitted data in the current blockchain; and
feeding back the signature information of the storage number of the first piece of submitted data in the current blockchain, the storage number of the first piece of submitted data in the current blockchain, and a public key of the proxy node of the first node as the proxy result to the first node.

16. The apparatus according to claim 11, wherein the operations further comprise:
  feeding back a submission result to the second node based on a storage number of the processing result in the current blockchain.

17. The apparatus according to claim 11, wherein the using the submission request and the signature information of the submission request as the second piece of submitted data, in response to the node in the current blockchain receiving the submission request sent from the second node being the proxy node of the second node, and signing for the second piece of submitted data with the private key to obtain the signature information of the second piece of submitted data comprises:
  determining whether there is an abnormality in the submitted content, in response to the node in the current blockchain receiving the submission request sent from the second node being the proxy node of the second node and the signature information of the submission request passing the verification by the public key of the second node; and
  using the submission request and the signature information of the submission request as the second piece of submitted data, in response to there not being an abnormality in the submitted content, and signing for the second piece of submitted data with the private key to obtain the signature information of the second piece of submitted data.

18. A non-transitory computer readable medium, storing a computer program thereon, wherein the program, when executed by a processor, causes the processor to perform operations comprising:
  receiving a query request sent from a first node in a blockchain other than a current blockchain and signature information of the query request, wherein there is a proxy node of the first node in the current blockchain, and the query request comprises a query content and a storage number of a public key of the first node in the current blockchain;
  acquiring the public key of the first node from the current blockchain based on the storage number of the public key of the first node in the current blockchain;
  acquiring query data indicated by the query content from the current blockchain, in response to the signature information of the query request passing verification by the public key of the first node;
  feeding back a query result to the first node based on the query data;
  receiving a submission request and signature information of the submission request sent from a second node in a blockchain other than the current blockchain, wherein there is a proxy node of the second node in the current blockchain, and the submission request comprises a submitted content and a storage number of a public key of the second node in the current blockchain;
  acquiring the public key of the second node from the current blockchain based on the storage number of the public key of the second node in the current blockchain;
  using the submission request and the signature information of the submission request as a second piece of submitted data, in response to a node in the current blockchain receiving the submission request sent from the second node being the proxy node of the second node, and signing for the second piece of submitted data with the private key to obtain signature information of the second piece of submitted data; and
  submitting the signature information of the second piece of submitted data and the second piece of submitted data to the current blockchain, such that the node in the current blockchain stores a processing result of the submitted content in the current blockchain through the employed consensus mechanism, wherein the node in the current blockchain processes the submitted content by: acquiring a public key of the proxy node of the second node and the public key of the second node from the current blockchain based on the storage number of public key of the second node in the current blockchain; and processing the submitted content to obtain the processing result, in response to the signature information of the second piece of submitted data passing verification by the public key of the proxy node of the second node and the signature information of the submission request passing verification by the public key of the second node.

* * * * *